Huberto M. Sierra,
INVENTOR.
BY.
ATTORNEY.

Fig. 2.

CHARACTER REPRESENTATIONS AND SORTING ORDER

| CHARACTER | CARD CODE | BINARY-CODED DECIMAL | GROUP |
|---|---|---|---|
| BLANK | | $\overline{BO}$ $\overline{BX}$ $\overline{B1}$ $\overline{B2}$ $\overline{B4}$ $\overline{B8}$ | (Lowest) |
| • | 12-3-8 | BO BX B1 B2 $\overline{B4}$ B8 | 12-Zone Special |
| ⌑ | 12-4-8 | BO BX $\overline{B1}$ $\overline{B2}$ B4 B8 | |
| & | 12 | BO BX $\overline{B1}$ $\overline{B2}$ $\overline{B4}$ $\overline{B8}$ | |
| $ | 11-3-8 | $\overline{BO}$ BX B1 B2 $\overline{B4}$ B8 | 11-Zone Special |
| * | 11-4-8 | $\overline{BO}$ BX $\overline{B1}$ $\overline{B2}$ B4 B8 | |
| — | 11 | $\overline{BO}$ BX $\overline{B1}$ $\overline{B2}$ $\overline{B4}$ $\overline{B8}$ | |
| / | 0-1 | BO $\overline{BX}$ B1 $\overline{B2}$ $\overline{B4}$ $\overline{B8}$ | 0-Zone Special |
| , | 0-3-8 | BO $\overline{BX}$ B1 B2 $\overline{B4}$ B8 | |
| % | 0-4-8 | BO $\overline{BX}$ $\overline{B1}$ $\overline{B2}$ B4 B8 | |
| # | 3-8 | $\overline{BO}$ $\overline{BX}$ B1 B2 $\overline{B4}$ B8 | No-Zone Special |
| @ | 4-8 | $\overline{BO}$ $\overline{BX}$ $\overline{B1}$ $\overline{B2}$ B4 B8 | |
| A | 12-1 | BO BX B1 $\overline{B2}$ $\overline{B4}$ $\overline{B8}$ | 12-Zone Alpha |
| B | 12-2 | BO BX $\overline{B1}$ B2 $\overline{B4}$ $\overline{B8}$ | |
| C | 12-3 | BO BX B1 B2 $\overline{B4}$ $\overline{B8}$ | |
| D | 12-4 | BO BX $\overline{B1}$ $\overline{B2}$ B4 $\overline{B8}$ | |
| E | 12-5 | BO BX B1 $\overline{B2}$ B4 $\overline{B8}$ | |
| F | 12-6 | BO BX $\overline{B1}$ B2 B4 $\overline{B8}$ | |
| G | 12-7 | BO BX B1 B2 B4 $\overline{B8}$ | |
| H | 12-8 | BO BX $\overline{B1}$ $\overline{B2}$ $\overline{B4}$ B8 | |
| I | 12-9 | BO BX B1 $\overline{B2}$ $\overline{B4}$ B8 | |
| J | 11-1 | $\overline{BO}$ BX B1 $\overline{B2}$ $\overline{B4}$ $\overline{B8}$ | 11-Zone Alpha |
| K | 11-2 | $\overline{BO}$ BX $\overline{B1}$ B2 $\overline{B4}$ $\overline{B8}$ | |
| L | 11-3 | $\overline{BO}$ BX B1 B2 $\overline{B4}$ $\overline{B8}$ | |
| M | 11-4 | $\overline{BO}$ BX $\overline{B1}$ $\overline{B2}$ B4 $\overline{B8}$ | 11-Zone Alpha (cont.) |
| N | 11-5 | $\overline{BO}$ BX B1 $\overline{B2}$ B4 $\overline{B8}$ | |
| O | 11-6 | $\overline{BO}$ BX $\overline{B1}$ B2 B4 $\overline{B8}$ | |
| P | 11-7 | $\overline{BO}$ BX B1 B2 B4 $\overline{B8}$ | |
| Q | 11-8 | $\overline{BO}$ BX $\overline{B1}$ $\overline{B2}$ $\overline{B4}$ B8 | |
| R | 11-9 | $\overline{BO}$ BX B1 $\overline{B2}$ $\overline{B4}$ B8 | |
| S | 0-2 | BO $\overline{BX}$ $\overline{B1}$ B2 $\overline{B4}$ $\overline{B8}$ | 0-Zone Alpha |
| T | 0-3 | BO $\overline{BX}$ B1 B2 $\overline{B4}$ $\overline{B8}$ | |
| U | 0-4 | BO $\overline{BX}$ $\overline{B1}$ $\overline{B2}$ B4 $\overline{B8}$ | |
| V | 0-5 | BO $\overline{BX}$ B1 $\overline{B2}$ B4 $\overline{B8}$ | |
| W | 0-6 | BO $\overline{BX}$ $\overline{B1}$ B2 B4 $\overline{B8}$ | |
| X | 0-7 | BO $\overline{BX}$ B1 B2 B4 $\overline{B8}$ | |
| Y | 0-8 | BO $\overline{BX}$ $\overline{B1}$ $\overline{B2}$ $\overline{B4}$ B8 | |
| Z | 0-9 | BO $\overline{BX}$ B1 $\overline{B2}$ $\overline{B4}$ B8 | |
| Zero | 2-8 | $\overline{BO}$ $\overline{BX}$ $\overline{B1}$ B2 $\overline{B4}$ B8 | No-Zone Numeric |
| 1 | 1 | $\overline{BO}$ $\overline{BX}$ B1 $\overline{B2}$ $\overline{B4}$ $\overline{B8}$ | |
| 2 | 2 | $\overline{BO}$ $\overline{BX}$ $\overline{B1}$ B2 $\overline{B4}$ $\overline{B8}$ | |
| 3 | 3 | $\overline{BO}$ $\overline{BX}$ B1 B2 $\overline{B4}$ $\overline{B8}$ | |
| 4 | 4 | $\overline{BO}$ $\overline{BX}$ $\overline{B1}$ $\overline{B2}$ B4 $\overline{B8}$ | |
| 5 | 5 | $\overline{BO}$ $\overline{BX}$ B1 $\overline{B2}$ B4 $\overline{B8}$ | |
| 6 | 6 | $\overline{BO}$ $\overline{BX}$ $\overline{B1}$ B2 B4 $\overline{B8}$ | |
| 7 | 7 | $\overline{BO}$ $\overline{BX}$ B1 B2 B4 $\overline{B8}$ | |
| 8 | 8 | $\overline{BO}$ $\overline{BX}$ $\overline{B1}$ $\overline{B2}$ $\overline{B4}$ B8 | |
| 9 | 9 | $\overline{BO}$ $\overline{BX}$ B1 $\overline{B2}$ $\overline{B4}$ B8 | (Highest) |

Huberto M. Sierra,
*INVENTOR.*
*BY*

*ATTORNEY.*

Fig. 3 BINARY CODED DECIMAL TO MODIFIED CODE CONVERTERS
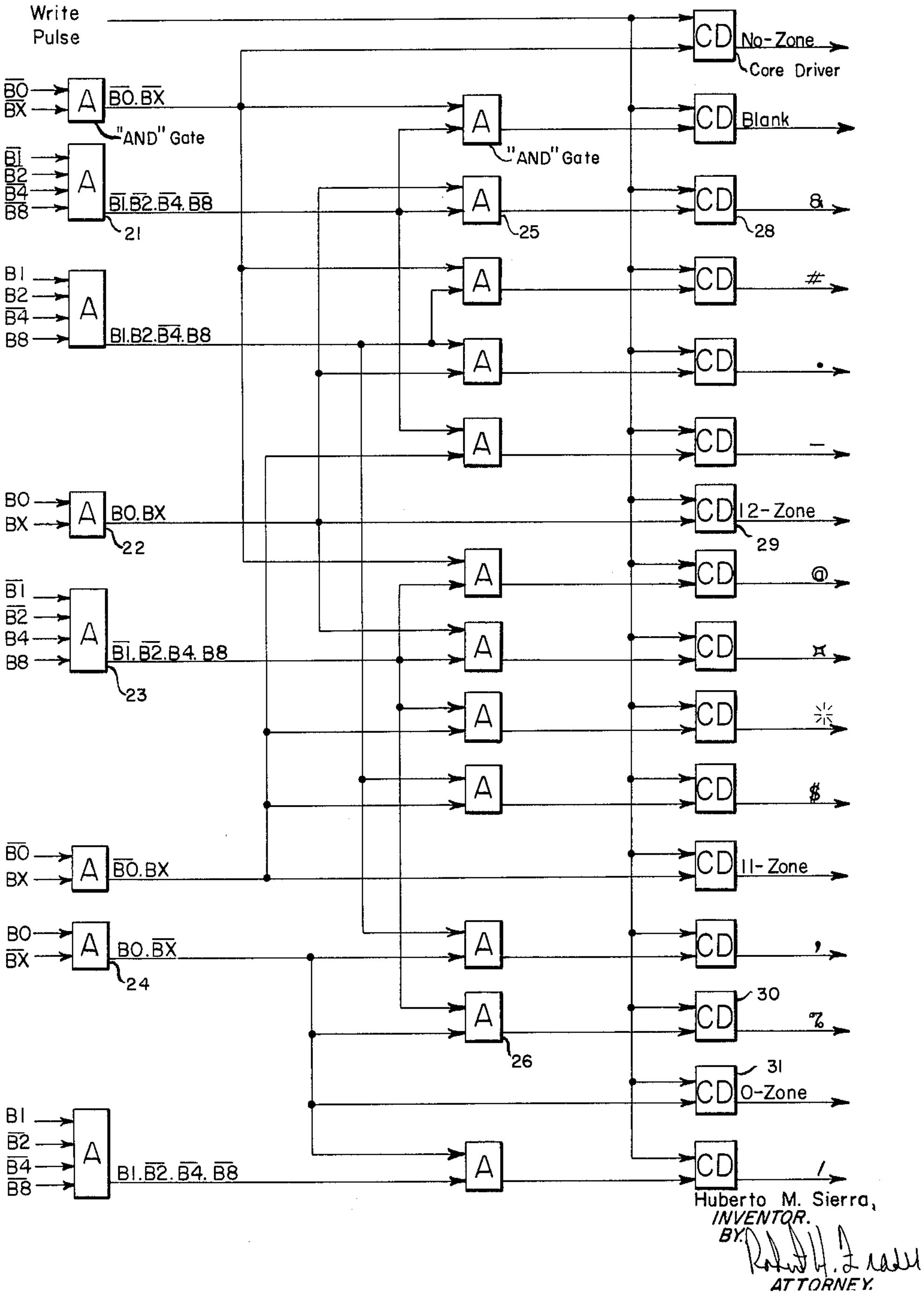
Huberto M. Sierra,
INVENTOR.
BY
ATTORNEY.

Fig. 6. SECOND COMPARATOR MATRIX
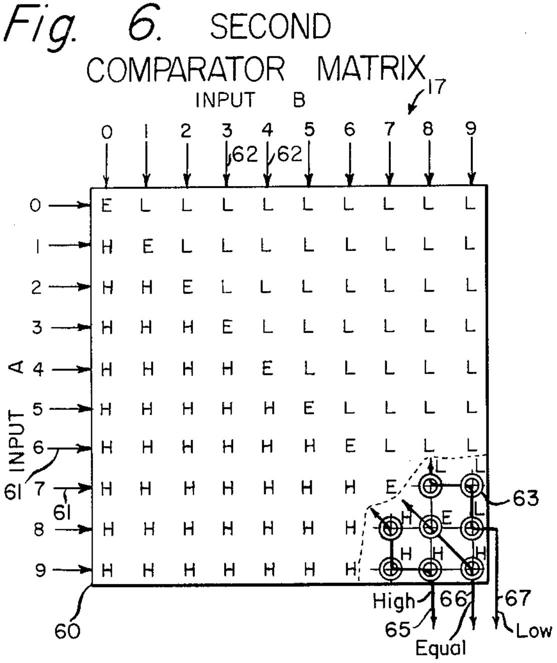
BINARY TO DECIMAL CONVERTER
Fig. 4.
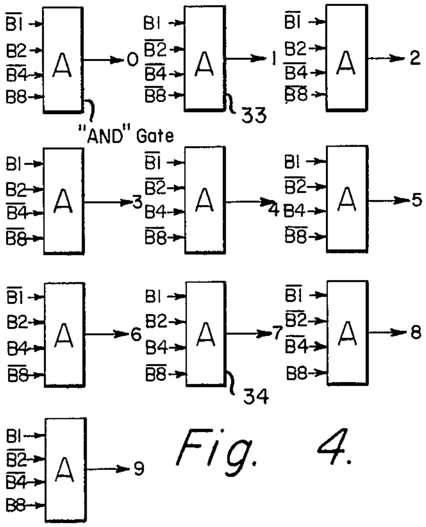
Fig. 7
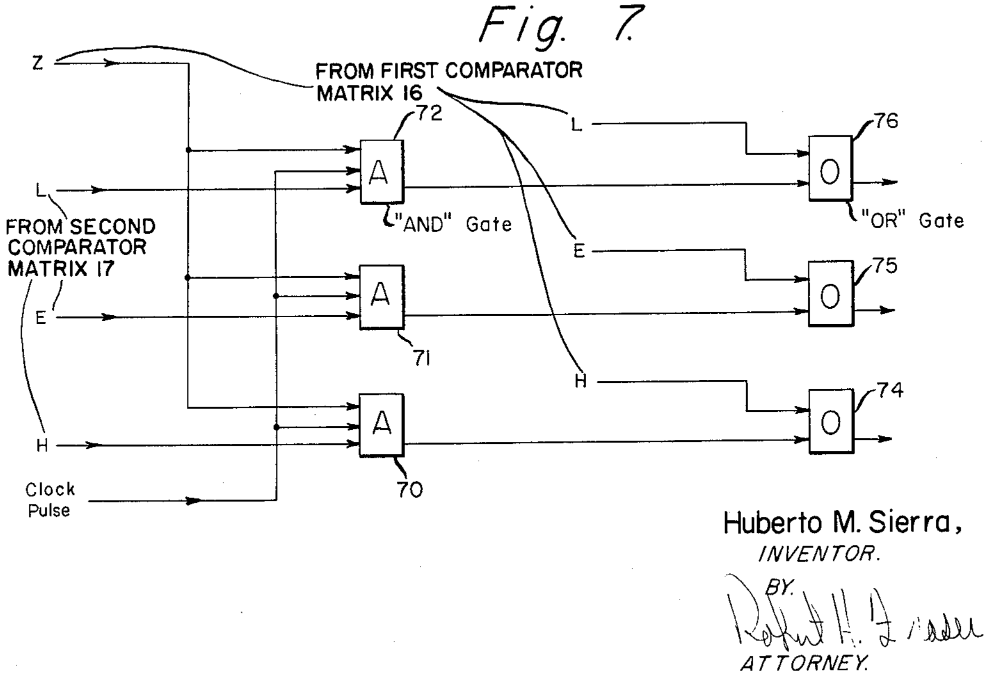
Huberto M. Sierra,
*INVENTOR.*
BY [signature]
*ATTORNEY.*

Aug. 31, 1965 H. M. SIERRA 3,204,221

CHARACTER COMPARATORS

Filed July 24, 1959 5 Sheets-Sheet 5

FIRST COMPARATOR MATRIX

Huberto M. Sierra,
*INVENTOR.*
*BY*
[signature]
*ATTORNEY.*

United States Patent Office 3,204,221

Patented Aug. 31, 1965

3,204,221
CHARACTER COMPARATORS

Huberto M. Sierra, Santa Clara, Calif., assignor to International Business Machines Corporation, New York, N.Y., a corporation of New York Filed July 24, 1959, Ser. No. 829,370
11 Claims. (Cl. 340—146.2)

This invention relates to digital sorting systems and more particularly to apparatus for comparing characters to establish the relative rank of the characters according to a predetermined order of precedence.

Sorting steps and techniques are fundamental to many data processing operations. Sorting steps, for example, may place information in alphabetic or numeric order. Thus, information relating to different customers or to different accounts may be placed in a condition suitable for orderly entry or recording in output devices. Sorting operations have been particularly difficult, however, especially where there are many different possible units of information to be sorted.

Comparator devices are the basic units used in sorters, just as characters are the basic unit of information. By "characters" is meant alphabetic symbols, Arabic numerals and special symbols, but the term is also intended to include binary information and any other basic unit for the representation of recorded information. Prior methods of character comparison have usually required extensive equipment or repetitive routines which require a good deal of time. Thus the methods heretofore in use have employed networks of gating elements arranged to perform the comparsion function according to a logical sequence, or the systems have used numerical coding of the information to effectively perform an arithmetic comparison. Both of these techniques are essentially quite difficult because of the many possible characters to be compared, and because of the equipment and time required to perform the operations satisfactorily. Inasmuch as character comparators are the central operating unit in sorting systems, speed is of prime importance in order to use the system most effectively. Moreover, reliability is also indispensable. It is of utmost importance that commercial transactions, on which most sorter systems operate, be accurately recorded.

It is highly desirable to employ a matrix comparator technique for the character comparison apparatus. Matrix comparators have previously been employed, and are particularly advantageous when constructed in a magnetic core matrix form. Magnetic core matrices usually utilize a rectangular array of bistable magnetic cores. Rows of cores in each coordinate direction are threaded by different addressing conductors, each of which represents a different possible character from an input corresponding to that coordinate. Thus, each core lies at the intersection of two addressing conductors, the cores being operated (changed in state) by coincident currents on the two addressing conductors. With this arrangement are also employed output circuits which determine the core which has been operated. Each output circuit is threaded serially through those cores having a given priority relationship between the inputs which are represented by the associated addressing conductors. Thus, no matter what characters are being compared, a one-step process enables the priority relationship to be established.

It is further desirable, however, to be able to utilize the matrix comparator technique with a minimum of equipment. It will be appreciated that in the usual information to be sorted there will be included all of the alphabetic characters, the Arabic numeral characters, and a number of special symbols. If these characters are initially in a binary coded decimal form, it may be necessary to decode each character into one out of perhaps fifty different address locations, and correspondingly to utilize a matrix of several thousand elements. Accordingly, it is desirable to be able to use the comparator matrix technque with considerably less decoding equipment and magnetic core elements.

It is, therefore, an object of the present invention to provide an improved character comparison system which operates more rapidly and reliably than systems heretofore available.

It is another object of the present invention to provide a character comparison system utilizing improved forms of the matrix comparator technique.

It is yet another object of the present invention to provide new and improved arrangements, utilizing relatively little equipment, for comparing a number of different characters to determine the relative rank of the characters in accordance with a selected order of precedence.

It is a further object of the present invention to provide improved systems for determining priority relationships between characters, which systems utilize matrices of bistable elements.

It is yet another object of the present invention to provide a new and improved comparator system for comparing characters which are provided in binary coded decimal form and which include a number of special symbols as well as alphabetic and numeric symbols.

A character comparison system in accordance with the present invention achieves these and other objects through the combined use of gating circuitry and more than one matrix of bistable elements. The system generates a modified code and utilizes groupings of characters, together with comparison of the groupings. Where the grouping comparison indicates that one character is equal to another, the equality indication is taken directly from the grouping comparison. A network of decision circuits is employed to utilize whichever of the outputs from the matrices is determinative of the equality relationship between the characters.

Specifically, a system in accordance with the present invention may first convert input characters provided in binary coded decimal form to a modified form corresponding roughly to a punched card code. In this code, special symbols and zonal groupings may be generated separately, and numeric values together with the zonal groupings may indicate alphabetic and numeric characters. The special characters and the zone characters may be compared in a first matrix of magnetic core elements. If the characters being compared are special symbols or within different zone groupings, the first matrix provides an output which is determinative of the relative rank. If special characters are not being compared, and the first matrix provides an indication that the zonal groupings are equal, a numeric comparison is made in the second matrix. A network of decision circuits utilizes the output from the first matrix, or the output from the second matrix when the zone equality indication is provided from the first matrix. This division of the comparison function into zone groupings and sequences within the groupings makes possible a reduction both in the decoding circuits utilized for addressing the matrices and in the size of the matrices themselves. The system nevertheless operates with the high speed and reliability inherent in magnetic core matrix arrangements.

Another feature of the present invention lies in the use of an arrangement to eliminate possible redundancies occurring in the use of the modified code. The special characters, for example, may also have a zone character designation. To eliminate possible duplicate outputs from the matrices, the addressing conductors for the special characters in the first matrix are also coupled through the core corresponding to the zone characters with an inhibiting relationship. Thus, when a special character is addressed, the redundant term in the zone characters is effectively cancelled through use of the inhibiting winding.

A better understanding of the invention may be had from a reading of the following detailed description and an inspection of the drawings, in which:

FIG. 2 is a chart showing various symbols, code designations therefore and the order of precedence in which the characters are to be sorted;

FIG. 3 is a block diagram of a binary coded decimal to modified code converter which may be used for the corresponding unit in the arrangement of FIG. 1;

FIG. 4 is a block diagram representation of a binary to decimal converter which may be utilized for the corresponding unit in FIG. 1;

FIG. 6 is a detailed representation, in simplified form, of the arrangement of a second comparator matrix which may be utilized for the like designated unit in FIG. 1; and FIG. 7 is a block diagram showing in detail the arrangement of elements in an output decision network which may be utilized in the arrangement of FIG. 1.

Figure 1:
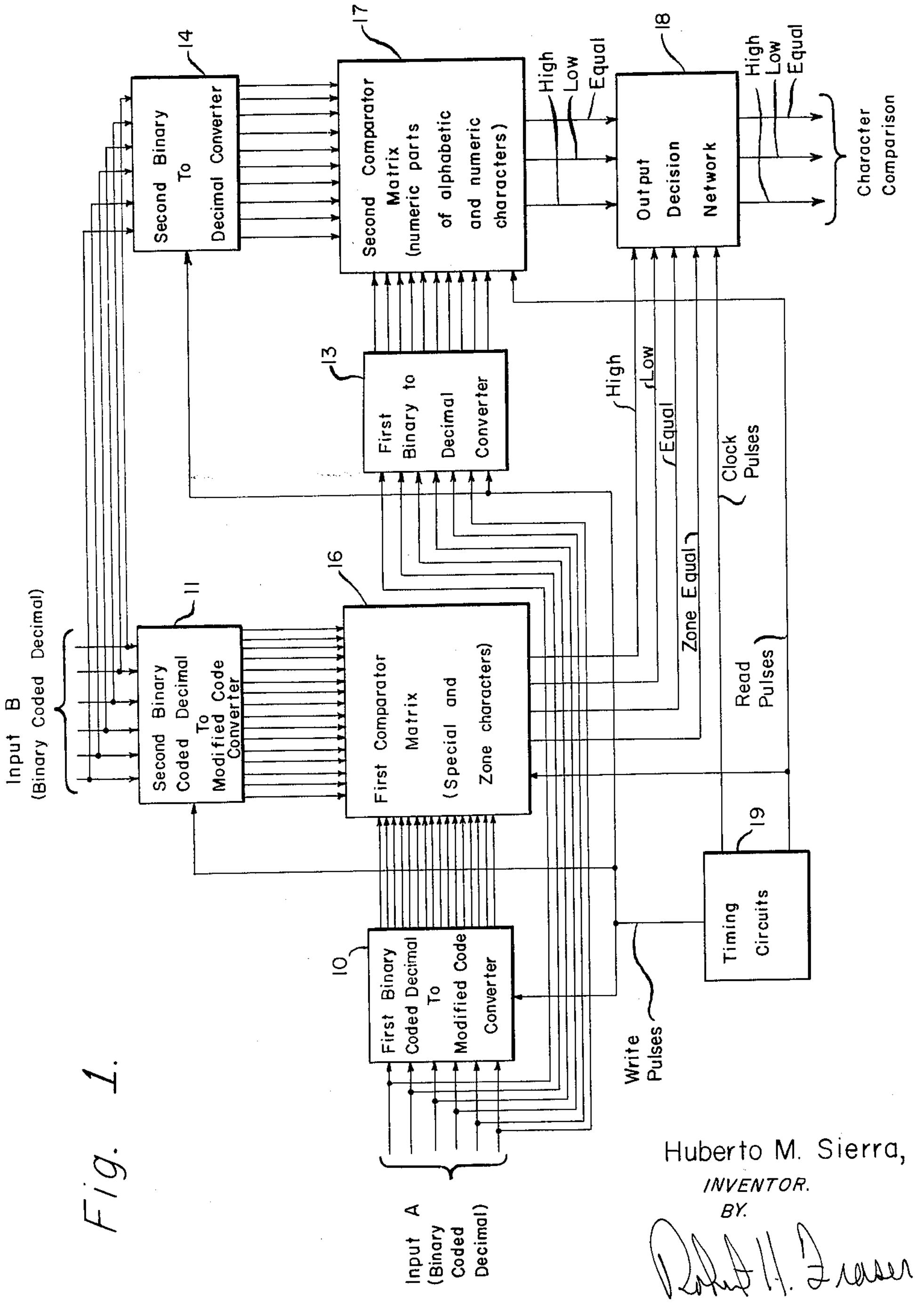
FIG. 1 is a block diagram representation of an arrangement in accordance with the invention which utilizes converters from binary coded decimal to a modified code, binary to decimal converters, first and second comparator matrices and an output decision network.

While the present arrangement may be utilized with virtually any system for coding information, it finds particular utility with the usual types of coding which are utilized to represent commercial data. Thus, the system will be described with respect to binary coded decimal information which contains special characters, such as those which denote percentages (%), or dollar signs ($), and also alphabetic and numeric information. While a wide variety of codes are suitable for representing this information, the specific code which is described here for illustrative purposes has been set forth in FIG. 2.

Referring briefly to FIG. 2, it may be seen that a number of characters or symbols, including a "blank" character, are provided in an ordered sequence. For each character is also provided an equivalent coding term as is used in conventional punched card codes. As is well known, in the punched card codes there is a zone designation, such as 12, 11, 0, and no zone, and also a single or dual numeric designation. While the punched card code is not generated directly in the present arrangement, it will be useful in understanding the manner in which character groupings are utilized.

For each character there is also provided, in FIG. 2, the corresponding binary coded decimal representation. For each character, the first two digital places B0 and BX are utilized to represent a zonal grouping. As in conventional logical representation, the value at any digital place is either the indicated value (e.g., B0) or the "NOT" value (e.g., $\overline{B0}$). Each character also has a numeric portion, which is coded in a binary form, with successive digital positions having binary weighted values, such as B1, B2, B4 and B8. Again, in the chart the numeric values are represented by indicated and "NOT" representations. Although the first two digits are used for the zonal grouping in the present example, it will be understood that the six digits may be used for a strictly numeric coding, if desired, or that some other coding scheme may be utilized.

Some modification is made herein of the zonal groupings, inasmuch as the zonal groupings for the special characters are not utilized. The "12-Zone Special" zone, for example, is not employed directly. With the zonal groupings which are employed for alphabetic and numeric characters, therefore, reference need be made only to the "12-Zone," and it will be understood that this refers to the "12-Zone" Alpha. The no-zone is to be considered a separate zone along with the 12, 11 and 0 zones. All these four zones are designated by zone characters.

FIG. 2 also establishes an order of precedence for the characters to be compared, and presents the characters in an ascending order. In this order the special characters, starting with the "blank" symbol, are of the lowest relative priority or rank. The alphabetic characters are of the next highest rank and the numeric characters are of the highest rank. When speaking herein of a comparison of two represented characters, it is intended to speak of comparing a first character with a second character so as to establish the relationship which the first has with respect to the second. Thus, when the result of a comparison is said to be "low," it is intended to connote that the first character is lower, in the established order of precedence, than is the second character.

*Overall system*

The general relationship of the principal functional units of an arrangement in accordance with the invention is shown in the block diagram of FIG. 1. Referring now to that figure, it may be seen that two binary coded decimal input characters, referred to as input A and input B, are to be compared, and that the results of the character comparison are to be provided as outputs in the system. As discussed above, input A is to be compared with respect to input B.

Each of the input characters is provided directly on a number of parallel input conductors to converter circuitry which operates to generate like character representations in a different, modified, code. Input A characters, for example, are provided in the binary coded decimal form to a first binary coded decimal to modified code converter 10 and also to a first binary to decimal converter 13. Input B characters are similarly provided to a binary coded decimal to modified code converter 11 and a second binary to decimal converter 14. Each of the converters to the modified code provides, in the present example, outputs on one of sixteen output lines, the outputs from the two converters 10, 11 serving as addressing conductors for a first comparator matrix 16. Each group of addressing conductors is disposed in one of the rectangular coordinates of the first comparator matrix 16, as is described in greater detail below.

In like fashion, each of the converters 13, 14 to decimal values has ten output lines. Each of these groups of output lines provides the addressing conductors in a different rectangular coordinate for a second comparator matrix 17. The first comparator matrix 16 provides a comparison of special and zone characters for the system, while the second comparator matrix 17 provides a comparison of the numeric parts of alphabetic and numeric characters. The first comparator matrix 16 thus provides output signals on one of four output lines, which carry high (H), low (L), equal (E) and zone equal (Z) signals. Only high, low and equal signals are provided from the second comparator matrix 17, but all of these equality representations are supplied as inputs to an output decision network 18 consisting of logical gating elements arranged in a fashion described in detail with respect to FIG. 7.

Several timing signals are provided from timing circuits 19 to control the sequential operation of the various units of the system and to insure synchronism with associated portions of a sorter system. These timing signals include "write" pulses for the writing in of information, "read" pulses for the reading out of information, and clock or synchronizing pulses for controlling the timing of signals passing through the output decision network 18. Inasmuch as this relatively simple sequence of timing signals may be provided by a wide variety of well known circuits and techniques, or by control of the associated system, a detailed description has been omitted. It will be appreciated that the associated system may be specifically intended for sorting operations, or may be a general purpose data processing machine providing sorting operations as a specialized function. The present character comparison apparatus provides an essentially independent function and is therefore compatible with all such systems.

Very briefly, the system operates by first making a comparison in the first comparator matrix 16 of the special and zone characters generated by the modified code converters 10 and 11. If only special characters are provided or if there is a zonal inequality, the outputs of the first comparator matrix 16 are utilized in the output decision network 18 to control the outputs from the system. If alphabetic and numeric characters are being compared, and the characters have a zonal equality, the comparison which is concurrently made in the second comparator matrix 17 is utilized to govern the output. The second comparator matrix 17 compares only the numeric portions of the input characters, as provided by the binary to decimal converters 13 and 14.

Systems thus arranged enable a considerable reduction both in the conversion circuitry which is utilized to provide address locations and in the elements needed in the comparator matrices. Specific arrangements which may be used for the circuits making up the overall system may now be described in detail.

*Conversion circuits*

Only one of each type of the conversion circuits 10, 11, 13 and 14 need be described in detail, because the circuits of each type are identical in structure and operation. Furthermore, in the interests of simplicity no detailed description will be provided, because the operation of such structures is well understood when the relationship of the elements has been set out in detail as in FIG. 3. FIG. 3 shows the coupling of the logical gating units utilized in the binary coded decimal to modified code converters 10, 11 of FIG. 1. The term "binary coded decimal" is used in the general sense, even though the characters contain zonal digits as well as binary valued digits. The input characters are properly spoken of as being in binary coded decimal form inasmuch as they have a binary part and represent a decimal sequence of numbers.

The "modified" code which is generated by these circuits 10, 11 consists of the special characters and the zone characters which are utilized in the present arrangement. The code is modified in the senses that only a portion of the total number of characters is provided, and that there are both individual characters and zone characters. The characters which are provided individually are the special characters, which are of the lowest rank in the selected order of precedence. The code is additionally modified in that the zone characters represent the zonal portions of only the alphabetic and numeric characters. In this coding arrangement, redundancies do occur with respect to the special characters, but these redundancies are eliminated from the final output through operation of the comparator matrices. For the special characters, the output signals which are provided occur on only one of the number of output lines and thus the output lines may constitute the addressing conductors for the matrices of bistable elements.

A few examples will suffice to demonstrate the manner in which the "AND" gates, such as 21, 22, 23, 25 and 26 operate to actuate core driver circuits such as 28, 29, 30 and 31 to provide outputs from these conversion circuits. It will be noted that the inputs are provided on conductors which are designated by one of two values, such as B0 or $\overline{B0}$. For each of these inputs it is assumed that when energized the conductor carries a signal which can operate to prime the coupled input of an "AND" gate. Such signals may be derived in conventional fashion from flip-flops or signal inverters which have not been shown.

The various input designations may be seen to establish the logical relations between the "AND" gates which insure that for each combination of inputs only one output is provided. A few examples will suffice to establish this proposition, and the remainder of the examples for other characters may be verified by inspection. For the "&" character, outputs are provided from a core driver 28 which has one input primed by write pulses from the timing circuits (not shown in FIG. 3). The remaining input of the "&" core driver 28 is coupled to "AND" gates which determine the existence of the input signal pattern B0, BX, $\overline{B1}$, $\overline{B2}$, $\overline{B4}$, $\overline{B8}$, which may be seen from FIG. 2 to be the corresponding binary coded decimal pattern. The existence of this pattern is detected by one "AND" gate 21, which is responsive to the combination $\overline{B1}$, $\overline{B2}$, $\overline{B4}$, $\overline{B8}$, and another "AND" gate 22 which is responsive to the input combination B0, BX. Both of these "AND" gates 21 and 22 provide outputs to operate a third gate 25. Thus, all three of the "AND" gates 21, 22 and 25 are actuated to provide an output coincident with the write pulse from the "&" core driver 28. The "12-zone" core driver 29 also provides an output, which is in a sense redundant, but which redundancy is taken care of independently in the remainder of the system.

A second example is in the provision of the "12-zone" signal from the corresponding core driver 29. Whenever the B0, BX combination occurs, the corresponding "AND" gate 22 provides an output which results in an output from the "12-zone" core driver 29, no matter whether the remaining digits in the particular character establish it as a special, alphabetic or numeric character.

A third example is derived from the provision of a "%" signal, the binary coded decimal representation for which is B0, $\overline{BX}$, $\overline{B1}$, $\overline{B2}$, B4, B8. For this character, the B0, $\overline{BX}$ combination is detected by the "AND" gate 24 and the $\overline{B1}$, $\overline{B2}$, B4, B8 combination is detected by the "AND" gate 23. The outputs from these two gates are applied together to the "%" "AND" gate 26 which provides an output from the directly coupled core driver 30 upon the coincident application of a write pulse. Note again that the "0-zone" core driver 31 also provided an output at the same time because of the coupling to the gate 24.

The binary to decimal conversion circuits are essentially a group of "AND" gates, such as are shown in FIG. 4. As in FIG. 3, the signals supplied as input are provided in the B1 and $\overline{B1}$ designation. The occurrence of each unique numeric signal combination is detected by a different "AND" gate. Thus, the decimal numeral "1" corresponds to the binary value B1, $\overline{B2}$ $\overline{B4}$ $\overline{B8}$ and actuates the "AND" gate 33. A decimal "7" corresponds to a binary B1 B2 B4 $\overline{B8}$ and actuates the "AND" gate 34. Similar relationships may be seen to exist for each of the other binary input combinations and corresponding decimal outputs.

*Comparator Matrices*

Figure 5:
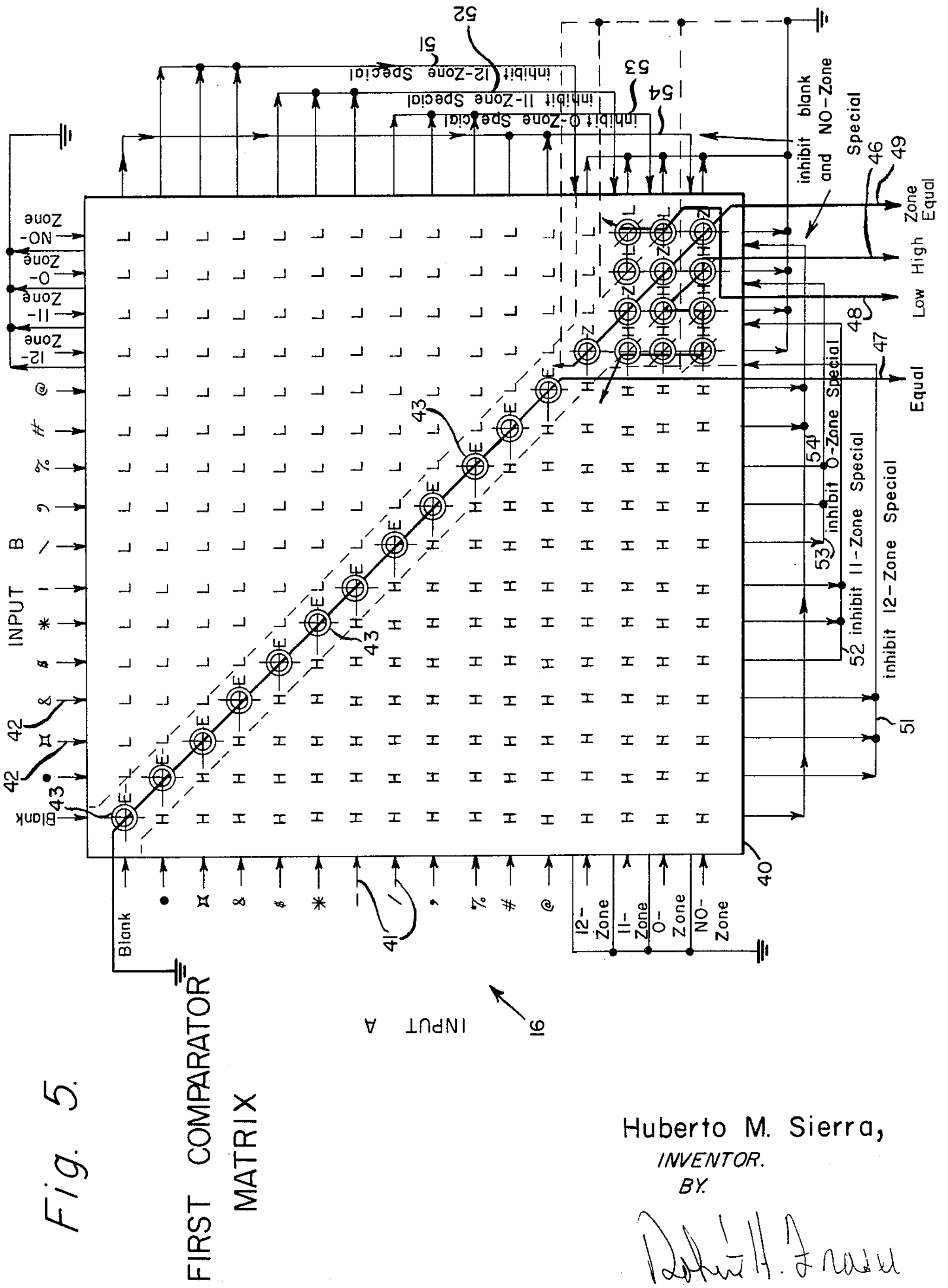
FIG. 5 is a simplified representation of the arrangement of a first comparator matrix which may be utilized for the corresponding unit in the block diagram of FIG. 1.

The first Comparator Matrix 16 of FIG. 1 shown in detail in FIG. 5, consists of a rectangular array of horizontal rows and vertical columns of magnetic elements. For each horizontal row, there is an addressing conductor 41 corresponding to one of the outputs of the first binary coded decimal to modified code converter 10 (FIG. 1). Similarly, for each vertical column there is also an addressing conductor 42 corresponding to a different output from the second binary coded decimal to modified code converter 11 (FIG. 1). These various addressing conductors 41, 42 thus define the grid or matrix of magnetic elements. The magnetic elements themselves are in the form of toroidal magnetic cores 43, each of which is positioned at the intersection of a different pair of addressing conductors 41, 42. For simplicity of representation, only a few of the magnetic cores 41 and 42 have been illustrated in detail, the area containing this detailed representation being encompassed by a dotted line. The remaining cores 43 have been indicated only generally by a character designating the relative rank or equality sense which they represent, but it will be understood that the entire matrix in this exemplification consists of a uniformly disposed array of elements 43.

As may be seen on the margins of FIG. 5, each of the addressing conductors 41 or 42 corresponds to a selected character in the modified code provided by the converters 10, 11. That is, each of the conductors 41, 42 corresponds to a special character or to a zone character. For convenience in representing and visualizing the arrangement, the sequence of characters is the same for each coordinate starting from the upper lefthand corner of the array 40. Each of the magnetic cores 43 lies at the intersection of a different pair of conductors 41 and 42. Thus, each of the magnetic cores 43 occupies a unique position and this fact, in conjunction with the manner in which outputs may be taken from the cores 43, may be used to provide indications of the equality relationship of the characters represented by the associated addressing conductors 41 and 42.

In addition to the fact that only a few of the magnetic cores 43 and only a portion of the addressing conductors 41 and 42 have been shown in detail, a number of other omissions have been made for simplicity. Thus, rectifying elements and driving circuitry which are often utilized for the operation of the cores have been omitted. Similarly, a read winding may be utilized to thread each of the cores 43, so as to reset an operated core 43 and provide an output pulse. The read winding is not shown in FIG. 5.

Output sensing circuits are utilized in conjunction with various patterns of the cores 43. These output sensing circuits serially thread a number of the cores 43 in a pattern which is determined by the equality relationship between the input addressing conductors 41 and 42 for that core 43. This equality relationship may be termed "high" (H), when the rank of the first character, input A, is higher than that of input B. Similarly, the equality relationship may be termed "low" (L) when the converse is true, and "equal" (E) when the input characters have the same rank in the established order of precedence. Considering only the special characters disposed in the array 40 of FIG. 5, each of the magnetic cores 43 may be given a character representing the equality relationship of the associated input conductors 41, 42. Along a diagonal symmetrically dividing the special character portion of the array 40, from the upper lefthand corner all of the cores 43 represent an equality relationship and accordingly have been given the designation E. These cores 43 lie at the intersection of like characters, as may be seen by inspection. In the half of the array below this diagonal, the addressing conductor 41 for the input character A is of higher rank than the addressing conductor 42 for input B, so that the core has been given the designation H. Similarly, the remaining cores 43 represent the condition L in which the A character is lower in rank than input B.

The same symmetry holds true for comparison of zone characters, as to high and low relationships, but a different designation is used where zone characters of equal rank are compared. The "zone equal" designation is termed Z, and is kept separate from E for reasons which are described more fully below. Having established the equality relationships which each individual magnetic core 43 represents, therefore, it may be seen that each like-designated group of magnetic cores may be utilized to provide a corresponding output. Thus, a first output sensing circuit 46 may be designated as the "high" output 46. In similar fashion other circuits 47, 48 and 49 may be designated the equal, low and zone equal output circuits 47, 48 and 49 respectively. Each of these output circuits serially threads all of those cores 43 in the matrix which have a similar equality designation.

The operation of the matrix is dependent upon coincident energization of one of the conductors 41 and 42 in each of the coordinate directions. The magnetic cores 43 which are utilized have, as is well known, a rectangular hysteresis characteristic, and the current which is utilized to drive them is so adjusted that coincident currents on the two conductors are needed in order to change the state of the core 43. A current on a single conductor is insufficient to drive the core 43 to saturation in the opposite direction. Again because of the rectangular hysteresis characteristic, a core which is driven by only half of the current needed for reversal of state remains substantially at saturation in the initial magnetization condition. Accordingly, when the two input characters are provided only the core representing the correct equality relationship for those input characters is changed in state, or "operated." Then, when a read signal is applied to return the cores 43 to their initial state of magnetization, only the core 43 which has been operated will induce a current in the output circuit 46, 47, 48 or 49 which is threaded therethrough.

Certain aspects of this arrangement provide a number of features which enable a sharp reduction in the amount of equipment which is employed. The special characters are not given zonal grouping signals, and thus when a comparison is made between a special character and a zone character the zone characters, all of which relate to the higher rank alphabetic and numeric characters, will be seen to be indicated as of a higher rank. When the "/" character is compared to the "11 zone" character, for example (the "11 zone" being input B), it will be seen that the proper (L) relationship is indicated. The zone characters themselves have an established order in the selected order of preference, so that a comparison between them may be made directly. When the zone characters are of equal rank, however, one of the Z magnetic cores 43 is operated and a signal is provided on the zone equal output for use in controlling the second comparator matrix as will be understood from the description provided below.

As discussed above with respect to the modified code converters 10, 11 redundant signals are provided with a number of the special characters. Accordingly, as determined by the redundant terms, there is a feedback between the addressing conductors 41 and 42 which thread the special characters and the columns or rows which contain the zone characters in the same coordinate. Four inhibit conductors are used, each threading the cores 43 representing a different zone character column or row, and each coupled in a selected relation to several of the addressing conductors 41, 42. This redundancy may be verified by a review of the circuits of FIG. 3. For example, the "$" special character, the "*" special character and the "-" special character each is generated along with a concurrent redundant "11-zone" term. Accordingly, the addressing conductors 41 for these three special characters are coupled together and to a conductor 52 which may be termed the inhibit "11-zone special" winding 52. This inhibit winding 52 is threaded through each of the magnetic cores 43 in the 11-zone row and column so as to inhibit the operation thereof. Similar inhibit windings 51, 53 and 54 are employed for the 12-zone, 0-zone and no-zone rows and columns respectively.

Reference may be made to the second comparator matrix 17, shown in FIG. 6. The second comparator matrix 17 is similar in configuration and operative relation of its elements to the arrangement of FIG. 5, and therefore need not be described in detail. As in FIG. 5, similar designations of H, E and L have been used to signify the equality relationship at the various cores. The second comparator matrix consists of a rectangular array 60 of magnetic cores having a number of input conductors 61 and 62 for input character A and input character B respectively. In the same way as in FIG. 5, only a portion of the magnetic cores 63 threaded by the addressing conductors 61 and 62 have been shown in detail, these being set off by a dotted line encompassing them. One output sensing circuit 65 indicates the high relationship, when considering input A with respect to input B, a second output circuit 66 indicates the equal relationship, and a third output circuit 67 indicates the low relationship.

The characters provided as inputs to the second comparator matrix 17 consist of the numeric parts of the binary coded decimal input information. Starting in the upper lefthand corner of the matrix, the successive conductors 61 and 62 in each coordinate direction are arranged in like ascending order of rank. Accordingly, starting also in the upper left hand corner (as seen in FIG. 6) a diagonal across the array 60 denotes the intersection of the addressing conductors 61 and 62 which are of like rank. Above this diagonal all the magnetic cores denote a low equality relationship for the desired comparison, while below the diagonal the magnetic cores 63 denote the high equality relationship. Operation of the second comparator matrix in operating a given core 63 upon the application of coincident signals on conductors 61 and 62 in each coordniate direction follows that of the arrangement of FIG. 5. Inasmuch as only binary quantities in the input characters are compared, this may be referred to as a comparison of the numeric parts of the alphabetic and numeric characters.

*Output decision network*

Final determination of the output from the comparator matrices 16 and 17 of FIG. 1 which is to be provided as output from the system is made by the output decision network 18 of FIG. 1. This network is shown in detail in FIG. 7. It consists, in the present exemplification, of a group of three 3-input "AND" gates 70, 71 and 72 and a group of three 2-input "OR" gates 74, 75 and 76. The H, E and L signals from the second comparator matrix are each applied to one input of a different one of the "AND" gates 70, 71 or 72 respectively. A second input of each of these gates is responsive to Z signals from the first comparator matrix, while the remaining input of each of the gates 70, 71, 72 is responsive to clock pulses from the timing circuits of FIG. 1. Accordingly, when both the zone equal (Z) indication is provided from the first comparator matrix and the clock pulse is provided from the timing circuits, the "AND" gates 70, 71, 72 are fully primed to be activated by a signal from the second comparator matrix. Stated in another way, when the first comparator matrix has determined that alphabetic and numeric characters have been provided, and that they fall in the same zone, the output is taken from the second comparator martix. Only that "AND" gate 70, 71 or 72 which receives a signal from the second comparator matrix provides an output.

The "OR" gates 74, 75, 76 provide the function of combining the outputs of the two comparator matrices. The H, E and L signals from the "AND" gates 70, 71, 72 respectively, or from the first comparator matrix, provide the high, equal and low signals from the "OR" gates 74, 75 or 76. These outputs thus provide the final decision of the comparator system.

*Operation*

In order to understand the flow of information through the system, and the operation of the system as a whole, reference should be made principally to the system diagram of FIGS. 3 through 7, bearing in mind the codes and the order of precedence for the characters which are delineated in FIG. 2. The input characters, A and B, are provided from the sorting or general data processing system sequentially in pairs. These binary coded decimal signal patterns may represent characters which form parts of words or larger blocks of information which are to be sorted. The sorting system may be performing a routine in which it is alphabetizing a list of names provided at random. Or the system may be placing information in order in accordance with numerical account or special symbol sequences. In performing such routines, the system usually compares the most significant characters first, until a final decision of equality is provided or until the first decision of inequality is derived. Thus, with names and with other blocks of information, the input characters are provided sequentially in pairs, one from each character. The order of precedence or significance established in FIG. 2 is particularly convenient, and is compatible with many existing systems, but it will be appreciated that other relative rankings could be ascribed to the various characters.

In general, each comparison performed by the system includes a series of three sequential steps. At the first step, write pulses from the timing circuits 19 control the application of the input characters A and B to the matrices 16 and 17 from the converters 10 and 11 and 13 and 14 respectively. In the second step, the read pulses from the timing circuits 19 control the readout of information from the comparator matrices 16 and 17 to the output decision network 18. In the third step, the clock pulses from the timing circuits 19 may be utilized to control the timing of the output signals. This sequence of operation not only permits synchronization with the associated system elements, but also is useful in preserving wave forms and signal stability.

In order to exemplify the operation of the system, several typical comparisons may be followed through in a general fashion from input to output. The operation of the individual elements of FIGS. 3 through 7 has already been discussed in detail and need not be repeated.

As a first example, it is useful to assume that two special characters are to be compared, specifically an input character A of "$" and input character B of "%." From FIG. 2, it may be seen that the "%" is of higher rank than is the "$," so that the result of the comparison (bearing in mind that character A is to be compared relative to character B) should be that character A is low.

These input characters A and B are utilized to control the selection of addresses in both the first and second comparator matrices 16 and 17, although only the first comparator matrix 16 is utilized for this comparison. Input character A is converted to a signal on one out of a number of lines by both the first binary coded decimal to modified code converter 10 and the first binary to decimal converter 13. Concurrently, input character B is similarly converted by the like coupled converters 11 and 14. Therefore, on application of the write pulses the converters 10 and 11 address the first comparator matrix 16 by providing coincident signals on the row conductor 41 (FIG. 5) which corresponds to the "$," and the column conductor 42 which corresponds to the "%." The magnetic core 43 at the intersection of these two conductors 41 and 42 which is operated may be seen to have the designation L, and thus to indicate the desired low relationship.

At the same time as these two signals for the special characters are used to address the first comparator matrix 16, the coupled converters 10 and 11 also provide redundant zone signals. An "11-zone" signal is provided along with the "$" signal, and a "%" signal is accompanied by a "0-zone" signal. The inhibit "11-zone" winding 52, and the inhibit "0-zone" winding 53, however, which are coupled back from the "$" and "%" addressing conductors 41 and 42 respectively prevent the cores 43 corresponding to the zone characters from being operated. Accordingly, only the correct core 43 is operated in the first comparator matrix 16 of FIG. 1.

Although the numeric parts of both special characters are utilized in the first and second binary to decimal converters 13 and 14 to generate addressing signals which operate a core 63 within the second comparator matrix 17, only outputs from the first comparator matrix 16 are utilized. When the read pulses are applied to the comparator matrices 16 and 17 the desired low signal provided from the first comparator matrix is directed out the coupled "OR' gate 76 of FIG. 7. The "AND" gates 70, 71 and 72 of FIG. 7 are not primed by a zone equal (Z) signal from the first comparator matrix, and accordingly the output from the second comparator matrix is not utilized. Therefore, in effect only one comparison, the system provides a correct indication of the relationship between two special characters.

A like comparison operation is effected when a special character is being compared with a zone character. Assume that the special character "*" is provided for input character A, while the "11-zone" character is provided for input character B. Reference to FIG. 2 again shows that the "11-zone" character is of higher rank than is the "*" character, so that a low equality relationship should again be indicated. As in the first example, the input signal patterns are converted by the modified code converters 10 and 11 to signals on one of the addressing conductors 41 and 42 of the detailed diagram of FIG. 5 for the first comparator matrix 16. The intersection of the horizontal row conductor 41 for the "*" character and of the vertical conductor 42 for the "11-zone" character has the desired L relationship. Accordingly, on readout an indication of the low relationship is provided from the system. A redundant "11-zone" addressing signal is also provided in the first comparator matrix for input character A, but the inhibit "11-zone" winding 51 prevents the operation of a core representing a zone comparison. As in the previous example also, outputs from the second comparator matrix 17 do not operate to provide an output through the output decision network 18.

What has been referred to as a comparison between special characters and zone characters will be appreciated to be a comparison between a special character and one of the alphabetic or numeric characters, because the zone character merely represents a grouping of the alphabetic or numeric characters. Thus, the comparison of two zone characters, which may be regarded as a third example, constitutes an initial comparison of alphabetic and numeric characters. If input character A is the "no-zone" character and input character B is the "12-zone" character, the equality relationship to be indicated is H, as may be verified on FIG. 2. The same relationship is also indicated by the first comparator matrix 16, as may be seen by finding the intersection of the appropriate conductors 41 and 42 in the detailed view of FIG. 5. This high indication again is provided in "OR" gate 74 of FIG. 7, and the high output is provided from the system. The concurrent comparison of the numeric parts of the alphabetic and numeric characters which are being compared in the second comparator matrix 17 again has no effect upon the output of the system.

When the characters which are being compared are both alphabetic or numeric, and when they also both fall in the same zonal grouping, however, the output of the second comparator matrix 17 is utilized. Assume that input character A is the alphabetic character K, and that input character B is the alphabetic character P. Both of these input characters fall in the "11-zone" grouping, so that within the first comparator matrix 16, a magnetic core 43 (FIG. 5) have the designation Z will be operated by the coincident energization of the input addressing conductors 41 and 42. The zone equal signal provided as output from the first comparator matrix accordingly primes the "AND" gates 70, 71 and 72 in the output decision networks shown in detail in FIG. 7. The numeric portion of the K character has the decimal value 2, while the numeric portion of the P character has the decimal value 7. By reference to FIG. 4, it may be seen that the binary to decimal converters 13 and 14 provide outputs on the correct decimal lines. Therefore, within the second comparator matrix 17 the intersection of the horizontal row conductor 61 and the vertical column conductor 62 may be seen to have the priority designation L. As shown in FIG. 2, this is the relationship between the selected input characters for the predetermined order of precedence. When the read pulses are applied to the second comparator matrix 17, an output is provided on the low output circuit 67 (FIG. 6). Because the "AND" gate 72 which is coupled to the low output circuit in the output decision network 18 (FIG. 7) is primed by the zone equal signal from the first comparator matrix 16, the correct low indication is therefore provided from the system. This output is substantially concurrent with the outputs derived but not utilized from the first comparator matrix 16, so that the system operates with essentially the same speed.

Illustrative examples have therefore been provided of each of the major types of character comparison operations which may be encountered. It has been seen that no matter what the characters being compared the operation constitutes essentially a single comparison step. A number of other structural and operative advantages will also be appreciated by those skilled in the art. For example, it will be recognized that the amount of conversion equipment needed to generate the addresses for the input characters is greatly reduced because of the use of the modified code and two comparator matrices. If a single matrix were used having one addressing conductor for each possible character in a given coordinate, the number of conductors would be multiplied and the number of cores would be increased by an order of magnitude. The difficulties in decoding to this number of addressing conductor lines will readily been seen. The arrangement is such, however, that in reducing the amount of decoding circuitry needed to provide the addressing information there is a concurrent decrease in the number of magnetic cores needed, even though there is no decrease in the system reliability. These advantages result from the use of the modified code which effects comparisons between zonal groupings and consequently divides the number of cores needed for the alphabetic and numeric comparisons.

It should not be considered that the use of zone characters is restricted to the coding scheme which has been described in detail. Instead, it will be appreciated that any zonal groupings which are desired may be utilized in this manner. If desired, for example, all of the characters may be given zone designations and accordingly the special characters may be treated in the same manner as alphabetic and numeric characters in the present exemplification.

Another feature of the present invention relates to the manner in which redundant terms in the addressing of the matrix may be eliminated through the use of inhibit windings. In effect, this constitutes a use of the matrix itself as a part of the decoding circuitry. While additional gating units could be utilized to eliminate the redundant terms, the use of the inhibit windings in a part of the matrix provides an extremely effective and economical way of accomplishing this result. A dual function is performed without an increase in system complexity or an adverse effect on system reliability.

In general, the system may be considered to use matrices of bistable elements in particularly advantages fashion. Through the use of more than one matrix and the versatile features of magnetic elements, the over-all system performs a difficult comparison operation at extremely high speed. The comparison is independent in speed of the characters which are being compared, so that successive characters may be provided in a regular sequence and the over-all sorting system may operate with extremely high speed. In achieving these speeds of operation, the system does not lose reliability. Instead, the presence of the magnetic core storage elements makes the operation especially reliable. The magnetic elements are bistable in nature and do not deteriorate with age or change in operating characteristics. Inasmuch as the character comparision is provided in an essentially self-sufficient system, this character comparison technique may be utilized with any form of data processing equipment which demands a character comparison.

Various alternative form will suggest themselves with respect to a number of the elements utilized in the system. Thus, the magnetic cores need not be of toroidal form. Moreover, the bistable elements need not be magnetic, but may be of any form which can be coincidentally addressed and separately coupled to output circuitry. It will also be recognized that the elements which are utilized may be effectively employed with other parts of a system. For example, the second comparator matrix consists of a decimal arrangement which may also have separate output sensing circuits arranged to provide an adder plane.

Although there has been described above and illustrated in the drawings particular arrangements of the invention for comparing characters and utilizing more than one comparator matrix and zonal comparisons as well as inhibiting circuitry to provide particular combinations of speed, reliability and economy, it will be appreciated that the invention is not limited to the specific illustrative arrangement. Accordingly, any modifications, variations or equivalent arrangements falling within the scope of the annexed claims should be considered to be a part of the present invention.

What is claimed is:

1. A system for establishing the order of precedence of input characters provided in binary coded decimal form, the system including in combination first decoding circuits responsive to the input characters for providing signals representative of special characters and zonal characters on one out of a number of conductors, a first comparator matrix responsive to the special and zonal character signals for providing first signals representative of the relative equality and inequality of the special and zonal characters, second decoding circuits responsive to the input characters for providing decimal signals representative of alphabetic and numeric characters on one out of a number of conudctors, a second comparator matrix responsive to the second decoding circuits for providing second signals representative of the relative equality and inequality of the alphabetic and numeric characters, and decision circuits coupled to both the matrices for providing a final output from the first and second signals, the decision circuits using inequality of the zonal characters to control the use of the second signals.

2. A system for sorting input characters comprising means for providing the input characters in binary coded decimal form, first and second binary coded decimal to modified code converters for providing individual signals on different lines representative of special and zone characters, a first magnetic core plane including a plurality of magnetic core elements, each of which elements is threaded by lines from each of the first and second converters and coincidently operated thereby, a first group of sensing circuits coupled in selected patterns to the magnetic core elements of the first plane for providing different priority indications from the magnetic cores which have been operated, first and second binary to decimal converter circuits, each responsive to a binary part of a different one of the input characters and providing decimal indications on one of a number of different lines, a second magnetic core plane consisting of a number of magnetic core elements, each of which elements is threaded by lines from each of the binary to decimal converters and coincidently operated thereby, a second group of sensing circuits coupled in selected patterns to the magnetic core elements in the second plane for providing different priority indications from the magnetic cores which have been operated, and decision circuits coupled to the sensing circuits of the first and second planes and providing signals indicative of the priority relationship between the input characters.

3. A system for comparing two individual characters, each of which is provided in a code having zone and character designations, the system comprising: two comparator matrices each responsive to the input characters and each including output circuits providing signals representative of high, low and equal comparisons, a first of the matrices comparing zonal and special characters and the second of the matrices comparing alphabetic and numeric characters, and gating circuits coupled in a selected fashion to the output circuits for selecting the outputs of the matrices which are to be provided as final outputs from the system in accordance with a predetermined order of precedence.

4. Apparatus for sorting pairs of input characters according to an established order of precedence, the input characters being provided as binary coded decimal signal patterns and the apparatus comprising in combination first decoding circuits responsive to the input character signal patterns for generating a first modified code in which selected characters have special and also group designations, a first comparator device coupled and responsive to the first decoding circuits for indicating the relative ranking of the input characters provided thereto, and also separately indicating equality between the groups, second decoding circuits responsive to the input character signal patterns for generating a second modified code in which selected characters have numerical designations, a second comparator device coupled and responsive to the second decoding circuits for indicating the relative ranking of the input characters provided thereto, and a network of gating elements coupled to the comparator devices for deriving outputs selectively from the first and second comparator devices in accordance with the outputs provided, indications of equality between groups being employed to control use of the indications from the second comparator device.

5. Apparatus for sorting input character signals provided in pairs and having an established order of precedence, the input characters being provided in a selected code and including special, alphabetic and numeric characters, the apparatus including in combination means responsive to the input character signals for providing special character signals on individual lines and also signals indicative of successive groupings in the established order of precedence, first comparator means for comparing the special character signals and the signals indicative of groupings, the existence of special character signals being arranged to inhibit the comparison of groupings, means responsive to the input characters for providing parts of the alphabetic and numeric character signals on individual lines, second comparator means for comparing the parts of the alphabetic and numeric characters which are provided, and an output network for utilizing outputs from the two comparator means in accordance with the signals provided.

6. Apparatus for establishing an order of precedence between two individual input characters in relation to a selected sorting order including in combinatiion first means for comparing the two input characters to determine their relative order to accordance with groupings of individual characters in the sorting order, second means for comparing the two input characters to determine their relative order in accordance with sequences within groupings in the sorting order, and an output network coupled to both comparing means for utilizing the outputs from the second comparing means when both characters fall within the same grouping.

7. Apparatus for establishing an order of precedence between two individual input characters in relation to a selected order of precedence wherein the characters are ranked in groups and sequences within groups including in combination a first comparator for comparing the sequence of the two input characters when both are in a lowest rank group of the selected order and also for comparing the relative group rank of the two input characters when at least one is in the remainder of the groups, a second comparator for comparing the sequence rank of the input characters within the remainder of the groups, and a decision network coupled to both comparators for utilizing outputs both from the first comparator and from the second comparator only when the two input characters being compared are of other than the relatively lowest rank group and fall in the same grouping.

8. Apparatus for comparing a first with a second input character to determine the relative rank of the two characters according to an established order of precedence for sorting the characters, each of the input characters being provided in binary coded decimal form and including special characters, alphabetic and numeric characters, in ascending order of precedence, the apparatus including in combination a first pair of data conversion circuits each responsive to a different one of the binary coded decimal input characters and each providing special character signals individually and zonal signals for the remaining characters on one out of a number of addressing conductors, a first comparator matrix including a number of rectangularly disposed magnetic cores, each threaded by at least one addressing conductor from each of the first pair of data conversion circuits, addressing conductors for the cores representing special characters being returned with an inhibiting coupling through the cores representing zonal groupings, each of the cores being operated by coincident currents on the two addressing conductors threaded therethrough in the absence of an inhibiting signal, the first comparator matrix also including a group of output windings, a first of which is inductively coupled in series to all of the magnetic cores representing a relation between the addressing conductors in which a first input character has a higher rank in the sorting order for both special and zonal groupings than the second input character, a second output winding threading all magnetic cores in which the second input character is of higher rank in the sorting order than the first input character, a third output winding threading all magnetic cores in which the value of the corresponding signals represented on the input conductors associated therewith are relatively equal in the sorting order, and a fourth output winding threading all magnetic cores which are associated with input conductors representing zonal grouping values alone which are relatively equal, a second pair of data conversion circuits each responsive to a different one of the binary coded decimal input characters and providing decimal numerical values which are supplemented by the zonal grouping values to determine the alphabetic or numeric character, each of the second pair of data conversion circuits providing signals on one out of a number of addressing conductors, a second comparator matrix including a number of rectangularly disposed magnetic cores, each threaded in the two different coordinate directions by one of the addressing conductors from each of the data conversion circuits of the second pair, three output windings inductively coupled in series in different patterns to individual ones of the magnetic cores, a first of the output windings threading those cores representing the relationship in which the intersecting addressing conductors represent the condition in which the first input conductor has a higher rank in the sorting order than the second input character, the second output winding representing the relationship between the input conductors in which the second input character is of higher rank than the first, and the third output winding representing the condition in which the relative ranks of the first and second characters are equal, and a network of gating elements coupled to the first through the fourth output windings of the first comparator matrix and the first through the third output windings of the second comparator matrix, the network of gating elements selectively utilizing the first through the third output windings from the first comparator matrix, in preference to the first through the third output windings from the second comparator matrix, but utilizing the first through the third ouput winding from the second comparator matrix when no output is provided on the first through the third output winding of the first comparator matrix and a signal is provided on the fourth output winding from the first comparator matrix.

9. Apparatus for sorting input character signals according to an established order of precedence, the apparatus including in combination decoding circuits for dividing the character signals into group and digit representative signals, the digits representing the relative position within the groups, the group and digit signals together defining the character, a first comparator matrix coupled to the decoding circuits for comparing the group signals for equality, a second comparator matrix coupled to the decoding circuits for comparing the digit signals for equality, and logic networks coupled to the first and second comparator matrices for utilizing indications of inequality from the first comparator matrix and also for utilizing indications from the second comparator matrix when the indications from the first comparator matrix are equal.

10. A comparator system for comparing input characters provided in a substantially binary coded form, the character system including decoding circuits responsive to the input characters for generating characters representing groupings of characters, each grouping corresponding to a continuous sequence of characters relative to an established order of precedence, comparison circuits coupled to the decoding circuits and responsive to the grouping characters for determining the relative rank of the characters, comparison circuits responsive to the relative position of characters within a grouping for providing indications of the relative rank within a grouping, and a decision network responsive to the comparison circuits for providing a final indication of relative rank.

11. A system for comparing input characters provided in an essentially binary coded form, the system including in combination means for generating zone characters representing groupings of the characters, each grouping corresponding to a continuous sequence of the characters according to an established order of precedence, a comparator matrix responsive to the zone characters for indicating the relative equality or inequality of the characters, decoding circuits responsive to the input characters for generating signals representative of the relative position of characters within the groupings, a second comparator matrix responsive to the decoding circuits for providing an indication of the relative rank within groupings, and an output decision network coupled to both of the comparator matrices for utilizing the output of the first comparator matrix in preference to the output of the second comparator matrix unless equality is indicated by the first matrix.

References Cited by the Examiner

UNITED STATES PATENTS

| | | | |
|---|---|---|---|
| 2,785,856 | 3/57 | Hobbs | 340—146.2 X |
| 2,843,838 | 7/58 | Abbott | 340—166 |
| 2,844,309 | 7/58 | Ayres | 340—146.2 X |
| 2,865,567 | 12/58 | Booth | 340—174.13 |
| 2,900,620 | 8/59 | Johnson | 340—149 |
| 2,914,748 | 11/59 | Anderson | 340—166 |
| 2,920,310 | 1/60 | Sallach | 340—149 |
| 2,973,508 | 2/61 | Chadurjian | 340—166 X |
| 3,008,129 | 11/61 | Katz | 340—146.2 X |

MALCOLM A. MORRISON, *Primary Examiner.*

IRVING L. SRAGOW, *Examiner.*